: 2,999,029
OPTICAL CEMENT
Donald E. Field, Arlington, Va., assignor to the United States of America as represented by the Secretary of the Navy
No Drawing. Filed May 23, 1958, Ser. No. 737,455
2 Claims. (Cl. 106—186)
(Granted under Title 35, U.S. Code (1952), sec. 266)

The invention described herein may be manufactured and used by or for the Government of the United States of America for governmental purposes without the payment of any royalties thereon or therefor.

The invention relates to an improved optical cement and to the method for preparing the same. More particularly the present invention is directed toward improving the thermoplastic properties of a plasticized cellulose caprate optical cement.

Recent developments in the manufacture and use of thermoplastic compositions containing therein commercially prepared cellulose caprate have resulted in compositions which are clear, rigid solids with good bonding properties to glass and plastics. The superior performance of cellulose caprate to wide variations of temperature, challenged the long-established Canada balsam as an optical cement, principally in air-borne optical instruments which are subject to great temperature changes during flight. Cellulose caprate, per se, is not sufficiently fluid at temperatures which are considered to be safe for heating an optical glass without causing a distortion in the glass, nor is the refractive index of the cellulose caprate sufficiently high to prevent reflection at the cemented surfaces.

Accordingly, an optical cement was developed by plasticizing cellulose caprate which resulted in a cement composition having a lower melting point and an improved refractive index which forms the subject matter in a copending application, Serial No. 474,308, filed on December 9, 1954, now Patent No. 2,855,322, which issued Oct. 7, 1958. As described therein, commercially available cellulose caprate is initially purified and decolorized, and then mixed with two plasticizers, poly-α-methylstyrene and N-cyclohexyl-p-toluenesulfonamide to form an optical cement that melts to a fairly thin fluid below 250° F. and has an improved refractive index as compared with that of the cellulose caprate alone.

It has now been determined that different batches of the prepared cement vary in their thermoplastic nature, that is, there are variations in the melting, softening and strength characteristics which cannot be uniformly corrected nor controlled by the production method of the cement. Due to variation in different batches of commercially prepared cellulose caprate, the plasticized cellulose caprate disclosed in the prior application results in a cement composition with a softening point, which in some cases, is considerably lower than that of the unplasticized caprate. The cement which now melts to a fairly thin fluid in the preferred temperature range below 250° F., in some instances fails to retain its former rigidity after it has cooled and solidified. For instance, a certain shear test requirement specifies that a cemented joint should be capable of withstanding a shear strength of 5 ounces per square inch of cemented surface at a temperature of 160° F. Some of the plasticized cellulose caprate does not meet this shear requirement nor do different batches of the plasticized composition establish any uniform test performance.

The present invention, therefore, deals with a method of treating commercially prepared cellulose caprate to provide further improvements in the plasticized cellulose caprate optical cement, as a result of which the composition obtains uniform and controllable thermoplastic characteristics and, in particular, the softening point of various batches of the cement composition is consistently modified to withstand a shear of 5 ounces per square inch of cemented surface at a temperature of 160° F. for a period of at least 24 hours. In addition the optical cement remains fairly fluid at temperatures below 250° F. which afford easy application of the cement at temperatures which will not cause distortion in the cemented optical glass, moreover, the refractive index of the cement is approximately equal to that of the optical glass.

For the purposes of the present invention, melting point and softening point referred to in this application pertain to that determined by the ball and shouldered ring method, E28–51T of ASTM; Book of ASTM Standards, Part 5, page 1204 (1952). The rigid solid condition (absence of cold flow) referred to herein is characterized as the absence of flow of the cement from the bond tested under an applied shear of 5 ounces per square inch of cemented surface of the optical assembly at a temperature of 160° F.

It is therefore an object of the present invention to provide a method for desirable optical cement with the desired thermoplastic and shear strength characteristics.

Another object of this invention is to provide a cellulose caprate which is initially treated to modify its composition and which is then plasticized to yield an optical cement which has more uniform and predictable properties than a cement containing untreated cellulose caprate.

A further object of this invention is to improve the method of preparing a thermoplastic composition having a higher softening point.

Other and more specific objects will become apparent upon a careful consideration of the following description.

In accordance with the present invention, a further improvement in the plasticized optical cement may be effected, more especially with respect to a uniform softening point for various batches of cellulose caprate and of a certain shear strength requirement for the cemented elements, if the commercial cellulose caprate that exhibits non-uniformity in properties in initially subjected to a hydrolytic treatment. It has been determined that hydrolysis of the caprate offers a means for modifying the caprate composition to yield uniform and more desirable results in the plasticized caprate composition which forms the improved optical cement of the present invention. Treatment of the caprate is therefore effected by swelling the polymer in a medium such as alcohol or aqueous acetic acid and hydrolyzed in the presence of an acid catalyst. The most satisfactory hydrolytic medium for the purposes of this invention is hydrochloric acid (C.P.) in methanol at a temperature of about 50° C. Due to the increased chain length of the ester group and hydrophobic nature of the cellulose ester, only a slight change in hydroxyl content occurs in the treated polymer, even after a considerable reaction time. It is not necessary to analyze the hydrolyzate but a rather simple and more effective means is found useful to regulate the extent of this reaction.

The hydrolytic treatment as practiced in this invention is just sufficient to render the cellulose caprate plasticized cement free from cold flow at 160° F. or below. It is primarily intended that commercial or base cellulose caprate which often exhibits a certain inconsistency and non-uniformity in properties be hydrolyzed in a hydrochloric acid-methanol mixture at 50° C. until the caprate is rectified in its composition to the extent that a plasticized sample of caprate will show more uniform properties. In order to follow the change in composition, a sample is removed from a hydrolyzing caprate polymer; a small plasticizing batch of cement is mixed and sample flats are cemented together with sample cement. The sample batch contains caprate and plasticizer in the same ratio by weight as the desired optical cement composition, the amounts being merely scaled down to provide sample amounts of optical cement. The plasticizers may vary in these compositions in amounts from about 20% to 50% by weight of caprate, this percent range will provide compositions which are rigid solids at 160° F. It is obvious that the higher the initial melting point of the base cellulose caprate, the more plasticizer can be added without increasing the cold flow of the resulting cement.

The extent of the hydrolytic reaction for a particular batch of polymer is determined by subjecting cemented samples to a shear test until the sample withstands a shear of 5 oz./in.² at 160° F. for 24 hours. Once the indicated hydrolysis time is obtained the materials to be hydrolyzed may be scaled up to any desired batch size. It is obvious to one skilled in the art that the amounts of methanol and hydrochloric acid used in the hydrolysis mixture are not critical; the reaction may proceed with other quantities and in other relative proportions, although the reaction rate of hydrolysis is thereby altered. The temperature of the reaction may be varied to a considerable extent: at room temperature the reaction requires about three times as much reaction time as that employed at 50° C.; on the other hand, a considerable increase in temperature alters the polymer composition far in excess of the desired hydrolytic treatment.

In treating base cellulose caprate in accordance with the present invention the preferred method is as follows: 100 grams of raw cellulose caprate is submerged in a mixture comprising 675 ml. of methanol and 75 ml. of hydrochloric acid (C.P.) to form a polymer suspension. The reaction is maintained at a temperature of 50° C. with an occasional shaking, while samples of solid caprate are withdrawn at one-day intervals to determine the extent of hydrolysis by plasticizing samples of treated caprate and determining their shear test performance. The samples of cellulose caprate are filtered, washed with water until the washings are neutral to litmus and then dried for two hours at 70° C. The dry samples are then plasticized by mixing 10 grams of the caprate with 1.2 grams of poly-α-methylstyrene and 0.8 gram of N-cyclohexyl-p-toluenesulfonamide and the mixture is melted to a thin fluid at about 240° F. Two optical flats of the type used for testing purposes are heated to 240° F. and cemented together by applying the molten cement to the lower flat and pressing the other flat piece over it until the cement has cooled sufficiently to harden. The cemented flats are then subjected to a shear force of 5 oz./in.² (22 g./cm.²) at 160° F. for a period of 24 hours. When the test sample can withstand this force, the caprate has been hydrolyzed sufficiently to provide a treated cellulose caprate which is suitable for an optical cement in accordance with the requirements of the present invention. Ordinarily the hydrolysis period takes about 2–3 days.

After hydrolysis of the cellulose caprate is complete, the reaction mixture is filtered, washed with water, and the wet caprate is extracted with an 80% aqueous methanol in a Soxhlet apparatus for about 24 hours. The extracted caprate is dried preferably overnight at 70° C.

The preparation of the new optical cement composition of the invention having a refractive index of 1.49–1.50 contains the following ingredients:

| | Parts |
|---|---|
| Hydrolyzed cellulose caprate | 100 |
| Poly-α-methylstyrene | 12 |
| N-cyclohexyl-p-toluenesulfonamide | 8 |

The treated cellulose caprate is dissolved in 650 parts toluene and the two plasticizers are also dissolved in small calculated amounts of toluene and added to the caprate-toluene mixture. The mixture is filtered through a Seitz filter which has been fitted with a ½-micron pore filter pad, at a pressure of 15 lbs. gauge. Usually several passes through the filter have been found necessary to remove all traces of unreacted cotton linters and other foreign material from the cement mixture. The liquid mixture is placed in a flask of sufficient size to allow ample space for frothing during the rapid distillation of the toluene, and said solvent is being removed by rapid distillation at a reduced pressure at about 120°–130° C. The pressure is reduced slowly to prevent carry-over and a vacuum formed is held for the time sufficient to remove all toluene. At the conclusion of the distillation the vacuum is relieved and the cement is allowed to settle to form a bubble-free melt which is then poured into clean containers and sealed against dust.

Clear, rigid cements for bonding preferably optical glass elements to each other can be prepared by using the two plasticizers, poly-α-methylstyrene and N-cyclohexyl-p-toluenesulfonamide in weight ratio of 3:2, 3:1 and 4:1, respectively. These cements holds the optical elements together without flow of the cement from the joint; they are rigid sparkling solids at 160° F. with plasticizer content of 20% by weight of the caprate. A suitable cement for bonding glass to glass optical elements is cellulose caprate which is treated in a methanol-hydrochloric acid solution, washed, dried and mixed with plasticizers: 100 parts treated cellulose caprate is mixed with 20 parts poly-α-methylstyrene and 5 parts of N-cyclohexyl-p-toluene-sulfonamide. The cement forms a thin melt at temperatures not exceeding 250° F., and upon cooling sufficiently below 250° F., said cement forms a rigid solid, which at 160° F. can withstand a shear of 5 oz./in.² for 24 hours.

Obviously many modifications and variations of the present invention are possible in the light of the above teachings. It is therefore to be understood that within the scope of the appended claims the invention may be practiced otherwise than as specifically described.

What is claimed is:

1. A method for preparing a thermoplastic composition suitable for binding optical elements which comprises treating cellulose caprate in a solution of methanol and hydrochloric acid for a time sufficient to improve the shear test characteristics of said composition, washing the treated caprate free of methanol and hydrochloric acid and drying the washed caprate, mixing the dried caprate with poly-α-methylstyrene and N-cyclohexyl-p-toluenesulfonamide in about 20% by weight of the cellulose caprate, said poly-α-methylstyrene and N-cyclohexyl-p-toluenesulfonamide being present in weight ratios of from about 3:2 to about 4:1, respectively, and thereafter heating the mixture sufficiently to form a workable melt.

2. A method for preparing a thermoplastic composition suitable for binding optical elements which comprises treating cellulose caprate in a solution of methanol and hydrochloric acid for a time sufficient to improve the shear test characteristics of said composition, washing the treated caprate free of methanol and hydrochloric acid and drying the washed caprate, mixing 100 parts of the dried caprate with 12 parts of poly-α-methylstyrene and 8 parts of N-cyclohexyl-p-toluenesulfonamide and thereafter heating the mixture sufficiently to form a workable melt.

References Cited in the file of this patent

UNITED STATES PATENTS

| | | |
|---|---|---|
| 1,861,915 | Hagedorn et al. | June 7, 1932 |
| 2,180,281 | Kyrides | Nov. 14, 1939 |
| 2,855,322 | Field | Oct. 7, 1958 |